Patented Sept. 15, 1925.

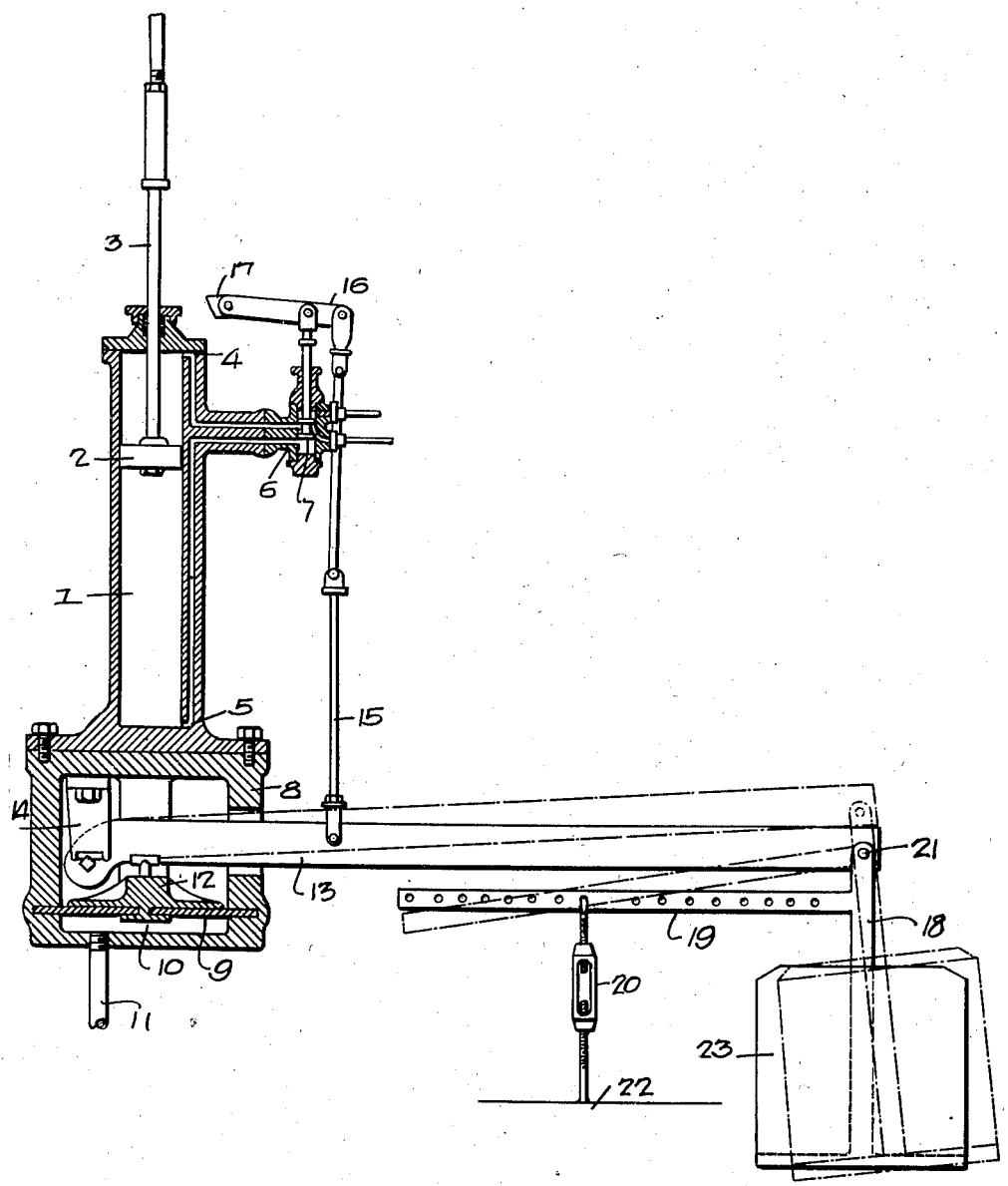

1,553,945

UNITED STATES PATENT OFFICE.

MYRON P. LAUGHLIN, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA.

PRESSURE REGULATOR.

Application filed October 14, 1920. Serial No. 416,841.

*To all whom it may concern:*

Be it known that I, MYRON P. LAUGHLIN, a citizen of the United States, residing in Philadelphia, Pennsylvania, have invented Pressure Regulators (Case A), of which the following is a specification.

One object of this invention is to provide a relatively simple and substantial attachment for use in connection with a pressure regulator which shall have such arrangement and construction of parts as will cause the regulator diaphragm and its associated mechanism to assume a predetermined definite position when acted on by a given boiler or other regulated pressure and for other different pressures to similarly assume other different but equally definite positions, with a view to providing a highly sensitive and perfectly definite control of boiler furnaces and the like, of pumps, blowers and other fluid pressure producing devices.

Another object of my invention is to provide a novel form of pressure compensating or regulating device including a movable diaphragm and mechanism associated therewith in such manner that an upward movement of said diaphragm is opposed by an increasing resistance until a point of equilibrium is reached, where the various parts of the device will come to rest until a further pressure change occurs,—the parts being likewise so arranged that a decrease in the pressure under the diaphragm such as would cause it to move downwardly, will cause a decrease in the force tending to move it down until it comes to rest in a state of equilibrium.

These objects and other advantageous ends I attain as hereinafter set forth, reference being had to the accompanying drawings, in which, The figure is a side elevation of part of a pressure regulator, showing my invention as applied thereto.

In the above drawing, 1 represents a cylinder having therein a piston 2 to which is connected a rod 3 attached to a valve, damper or other device capable of causing a change of pressure in the fluid generated or acted on. Connected to the opposite ends of the cylinder 1 are passages 4 and 5 leading from a valve casing 6 in which is a movable valve element 7 controlling the flow of a suitable motive fluid into and out of said passages and the ends of the cylinder to which they are connected.

In the present case the cylinder 1 is mounted on a box or casing 8 in whose lower portion is a flexible diaphragm 9 forming a chamber 10 connected through a conduit 11 with the source of the fluid under pressure to be controlled. The diaphragm 9 carries a plate 12 bearing against a main lever 13 fulcrumed within the casing 9 upon a suitable supporting block 14. Said lever extends out through an opening in the side of the casing 8 and through a link 15 is connected to an arm 16 pivoted to a fixed support 17 and also connected to the valve element 7.

The outer end of the lever 13 has pivotally connected to it one arm 18 of a T-lever including a second arm 19 extending at right angles and said first arm has mounted upon it a weight 23 of a mass suitable to the pressure acting on the diaphragm 9. The second arm 19 is attached through an adjustable mechanical connection 20 to some immovable structure 22, such as the frame of the regulator.

The member 20 preferably consists of a pair of threaded rods adjustably engaged by a turnbuckle and one rod is pivotally connected to the fixed structure 22 while the other may be connected to the arm 19 at any of a number of points between its free ends and the arm 18.

Under conditions of operation, if the pressure of the fluid delivered through the conduit 11 into the chamber 10 should be increased above a certain definite amount, the diaphragm 9 is forced upwardly, swinging the main lever 13 about its fulcrum and raising the fulcrum point 21 of the T-lever 18—19. Since, however, the arm 19 cannot move bodily because of its connection to the fixed structure 22 through the link 20, said arm is caused to assume an angle to the horizontal, swinging the rigidly attached arm 18 on the pivot 21 and forcing outwardly the weight 23. This action in effect increases the length of the main lever 13 and the pull upon the link 20, and through the lever 18—19 increases also the downward pull upon the main lever 13. Consequently any upward movement of the diaphragm 9 meets with a rapidly increasing resistance and is stopped when the upward and downward forces have reached an equality. The valve element 7 is consequently given a perfectly definite position for a predetermined increase of the pressure on the diaphragm 9, so that flow of motive fluid into and out of the cylinder 1 is so regulated as to cause the piston 2 and rod 3 to likewise assume a definite position.

If it be assumed that the diaphragm 9 moves downwardly as a result of the lessening of the pressure in the chamber 10, the main lever 13 under the action of the weight 23 will likewise fall, lowering the fulcrum point 21 so that the weight 23 swings inwardly from its normal position, causing a decrease in the effective length of the main lever 13. There is consequently a decrease in the downward force exerted upon the diaphragm 9 by the weighted arm 13 and its motion is stopped when the upward and downward forces have reached an equality.

The valve element 7 is thus moved to another definite position in its casing 6 corresponding to this reduced pressure in the chamber 10, so that the piston 2 and rod 3 are again caused to move to another definite position. The above described parts will thus assume definite positions for each alteration in the fluid pressure on the diaphragm 9, thus making it possible to obtain a sensitivity and definiteness of control of furnaces, pumps and other fluid pressure producing mechanisms which has long been desired in the art.

I claim:—

1. In combination, a main lever; an auxiliary T-lever positioned below said main lever and having a longitudinally extending arm and a cross arm, one end of the latter being pivoted to said first lever and the other end supporting a weight; and means for connecting the end of said first-mentioned arm to a support, whereby a movement of said main lever may cause a movement of said weight.

2. The combination in a pressure regulating device of a fluid actuated member; a main lever operative on said member; a T-lever, one arm of which is disposed below said first lever and connected thereto; a weight hung from another arm of said T-lever; and means for causing said weight to swing toward or from the fulcrum of the first lever as the latter is moved by the fluid actuated member.

3. The combination in a pressure regulating device of a fluid actuated member; a main lever operative on said member; a second lever having a pair of arms, one of which is connected to the first lever; a weight hung from the second lever; and means for causing said weight to swing toward or from the fulcrum of the first lever as the latter is moved by the fluid actuated member; said means comprising an element connecting the other of said arms to a fixed structure, said last-mentioned arm extending substantially parallel to said main lever and below the same.

4. The combination in a pressure regulating device of a fluid actuated member; a main lever operative on said member; a T-lever connected to the first lever; a weight hung from the second lever; and means for causing said weight to swing toward or from the fulcrum of the first lever as the latter is moved by the fluid actuated member, said means consisting of an element adjustably connecting the second lever to a fixed structure.

5. The combination in a pressure regulating device of a fluid actuated member; a main lever operative thereon; an auxiliary lever pivoted to said first lever and having an arm extending substantially parallel with the first lever; an element adjustably connecting said arm with a fixed structure and a weight connected to the second lever in position to be swung thereby toward and from the fulcrum of the first lever when the latter is moved by the fluid actuated member.

MYRON P. LAUGHLIN.